(12) United States Patent
Pandey et al.

(10) Patent No.: US 8,899,909 B2
(45) Date of Patent: Dec. 2, 2014

(54) SYSTEMS AND METHODS FOR STEAM TURBINE WHEEL SPACE COOLING

(75) Inventors: Vishwas Kumar Pandey, Karnataka (IN); Debabrata Mukhopadhyay, Karnataka (IN); Manikandan Srinivasan, Karnataka (IN); Santhosh Donkada, Karnataka (IN)

(73) Assignee: General Electric Company, Schenectady, NY (US)

( * ) Notice: Subject to any disclaimer, the term of this patent is extended or adjusted under 35 U.S.C. 154(b) by 828 days.

(21) Appl. No.: 13/169,070

(22) Filed: Jun. 27, 2011

(65) Prior Publication Data

US 2012/0324862 A1    Dec. 27, 2012

(51) Int. Cl.
| | |
|---|---|
| F01D 25/12 | (2006.01) |
| F04D 29/58 | (2006.01) |
| F02C 6/18 | (2006.01) |
| F02C 7/12 | (2006.01) |

(52) U.S. Cl.
CPC . *F01D 25/12* (2013.01); *F02C 6/18* (2013.01); *F02C 7/12* (2013.01); *F05D 2260/2322* (2013.01); *F05D 2220/31* (2013.01); *F05D 2240/55* (2013.01); *Y02E 20/16* (2013.01)
USPC .............. 415/1; 415/111; 415/114; 415/175; 415/176

(58) Field of Classification Search
CPC ....... F01D 11/003; F01D 15/10; F01D 25/12; F05D 2220/31; F05D 2240/55; F05D 2260/2322; F01K 13/00; F01K 23/10; Y02E 20/16

USPC ......... 415/110, 111, 112, 114, 116, 117, 175, 415/176
See application file for complete search history.

(56) References Cited

U.S. PATENT DOCUMENTS

| | | | |
|---|---|---|---|
| 4,150,917 A | 4/1979 | Silvestri, Jr. | |
| 4,551,063 A | 11/1985 | Raschke et al. | |
| 6,102,654 A | 8/2000 | Oeynhausen et al. | |
| 6,301,874 B1 * | 10/2001 | Wakazono et al. | ........ 60/39.182 |
| 6,382,903 B1 | 5/2002 | Caruso et al. | |
| 7,101,144 B2 | 9/2006 | Haje et al. | |
| 7,635,250 B2 | 12/2009 | Montgomery et al. | |

(Continued)

FOREIGN PATENT DOCUMENTS

| | | |
|---|---|---|
| EP | 0 735 238 | 10/1996 |
| EP | 0 735 254 | 10/1996 |

(Continued)

OTHER PUBLICATIONS

General Electric, Title: New Cooling Scheme for Combined HP-IP Rotor, Dated Apr. 6, 2011, pp. 1-22.

*Primary Examiner* — Igor Kershteyn
*Assistant Examiner* — Jason Davis
(74) *Attorney, Agent, or Firm* — Sutherland Asbill & Brennan LLP

(57) ABSTRACT

The present application provides a steam turbine system. The steam turbine system may include a high pressure section, an intermediate pressure section, a shaft packing location positioned between the high pressure section and the intermediate pressure section, a source of steam, and a cooling system. The cooling system delivers a cooling steam extraction from the source of steam to the shaft packing location so as to cool the high pressure section and the intermediate pressure section.

18 Claims, 4 Drawing Sheets

(56) References Cited

U.S. PATENT DOCUMENTS

| | | |
|---|---|---|
| 2002/0002819 A1* | 1/2002 | Gorman et al. ............. 60/39.07 |
| 2004/0101395 A1 | 5/2004 | Tong et al. |
| 2004/0247433 A1 | 12/2004 | Haje et al. |
| 2007/0017207 A1* | 1/2007 | Smith et al. ................ 60/39.182 |
| 2007/0292258 A1 | 12/2007 | Kirchhof et al. |
| 2009/0056341 A1 | 3/2009 | Sanchez et al. |
| 2009/0196735 A1 | 8/2009 | Bracken et al. |
| 2010/0008756 A1 | 1/2010 | Inomata et al. |

FOREIGN PATENT DOCUMENTS

| | | |
|---|---|---|
| EP | 0 735 243 | 12/1996 |
| EP | 1 452 688 | 9/2004 |
| EP | 1 892 376 | 8/2006 |
| EP | 1 845 234 | 9/2006 |
| EP | 1 936 115 | 12/2007 |
| EP | 2 143 888 | 1/2010 |

* cited by examiner

US 8,899,909 B2

SYSTEMS AND METHODS FOR STEAM TURBINE WHEEL SPACE COOLING

TECHNICAL FIELD

The present application and the resultant patent relate generally to turbo-machinery such as steam turbines and the like and more particularly relate to systems and methods for the cooling of steam turbine wheel spaces and the like using an external cooling source.

BACKGROUND OF THE INVENTION

Steam turbines extract work from a flow of steam to generate power. A typical steam turbine may include a rotor associated with a number of wheels. The wheels may be spaced apart from each other along the length of the rotor and define a series of turbine stages. The turbine stages are designed to extract useful work from the steam traveling on a flow path from an entrance to an exit of the turbine in an efficient manner. As the steam travels along the flow path, the steam causes the wheels to drive the rotor. The steam gradually may expand and the temperature and pressure of the steam gradually may decrease. The steam then may be exhausted from the exit of the turbine for reuse or otherwise. Higher temperature steam turbines may generate increased output as the increased temperature of the steam increases the overall energy available for extraction.

Generally described, a typical steam turbine may include a high pressure section, an intermediate pressure section, and a low pressure section. The sections may be arranged in series with each section including any number of stages. Within the sections, work is extracted from the steam to drive the rotor. Between the sections, the steam may be reheated for performing work in the next section. The high pressure and the intermediate pressure sections may operate at relatively high temperatures so as to increase the overall steam turbine output.

Although higher temperature steam turbines may be capable of increased output, the higher temperatures may challenge the performance of the materials used to manufacture the turbine components. For example, at least some known combined cycle power plants include a steam turbine that is coupled to a gas turbine via a single shaft. Particularly when only the gas turbine is carrying a load, at least some of the steam turbine components may increase in temperature because of windage. As a result, higher temperature materials must be used for components such as the rotor. Such higher temperature materials tend to be relatively expensive and may be difficult to manufacture in the desired geometry.

There is therefore a desire for improved systems and methods of cooling steam turbine components, particularly about the wheel space and the rotor thereof. Such improved systems and methods of cooling may allow for the use of lower temperature materials and hence lower cost materials without sacrificing overall efficiency and performance.

SUMMARY OF THE INVENTION

The present application and the resultant patent thus provide a steam turbine system. The steam turbine system may include a high pressure section, an intermediate pressure section, a shaft packing location positioned between the high pressure section and the intermediate pressure section, a source of steam, and a cooling system. The cooling system delivers a cooling steam extraction from the source of steam to the shaft packing location so as to cool the high pressure section and the intermediate pressure section.

The present application and the resulting patent further provide a method of cooling a number of wheel spaces of one or more sections of a steam turbine. The method may include the steps of driving a section of the one or more sections of the steam turbine with a first source of steam with a first temperature, extracting a second source of steam with a second temperature, wherein the second temperature is less than the first temperature, delivering the extraction of the second source of steam to a shaft packing location adjacent to the sections of the steam turbine, flowing the extraction of the second source of steam into the sections of the steam turbine, and cooling the wheel spaces in the sections of the steam turbine with the extraction of the second source of steam.

The present application and the resultant patent further provide a combined cycle power plant. The combined cycle power plant may include a steam turbine with a number of sections with shaft packing locations therebetween, a heat recovery steam generator, a gas turbine engine, and a cooling system. The cooling system delivers a cooling steam extraction from the heat recovery steam generator to one or more of the shaft packing locations so as to cool one or more of the sections and the wheel spaces therein.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
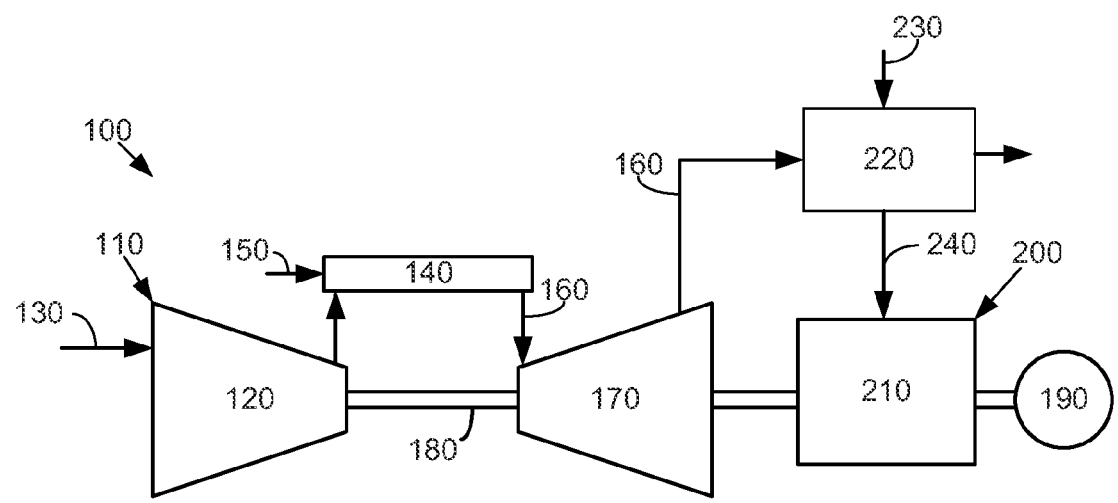
FIG. 1 is a schematic view of a combined cycle power plant with a gas turbine engine, a steam turbine, and a heat recovery steam generator.

Referring now to the drawings, in which like numerals refer to like elements throughout the several views, FIG. 1 shows a schematic view of a combined cycle power plant 100 as may be described herein. The combined cycle power plant 100 may include one or more gas turbine engines 110. The gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a compressed flow of fuel 150 and ignites the mixture to create a flow of combustion gases 160. Although only a single combustor 140 is shown, the gas turbine engine 110 may include any number of combustors 140. The flow of combustion gases 160 is in turn delivered to a turbine 170. The flow of combustion gases 160 drives the turbine 170 so as to produce mechanical work. The mechanical work produced in the turbine 170 drives the compressor 120 via a rotor 180 and an external load 190 such as an electrical generator as will be described in more detail below. The compressor 120, the combustor 140, and the turbine 170 may or may not be integrally related.

The gas turbine engine 110 may use natural gas, various types of syngas, and/or other types of fuels. The gas turbine engine 110 may be any one of a number of different gas turbine engines offered by General Electric Company of Schenectady, N.Y. The gas turbine engine 110 may have different configurations and may use other types of components. Multiple gas turbine engines, other types of turbines, and other types of power generation equipment also may be used herein together.

The combined cycle power plant 100 also may include a steam turbine system 200. The steam turbine system 200 may include a steam turbine 210 as will be described in more detail below. The steam turbine 210 may be coupled to the rotor 180 of the gas turbine engine 110. The steam turbine 210 also may include a separate rotor in multi-shaft combined cycle systems and/or a selectively coupleable rotor. The steam turbine system 200 may include a heat recovery steam generator 220 coupled to the steam turbine 210. The heat recovery steam generator 220 may use the flow of combustion gases 160 exiting the turbine 170, alone or in combination with other sources, to heat a flow of water 230 into one or more flows of steam 240. The one or more flows of steam 240 may be used to drive the steam turbine 210. The steam turbine 210 may drive the load 190 and/or a separate load as may be desired. Other components and other configuration may be used herein.

Figure 2:
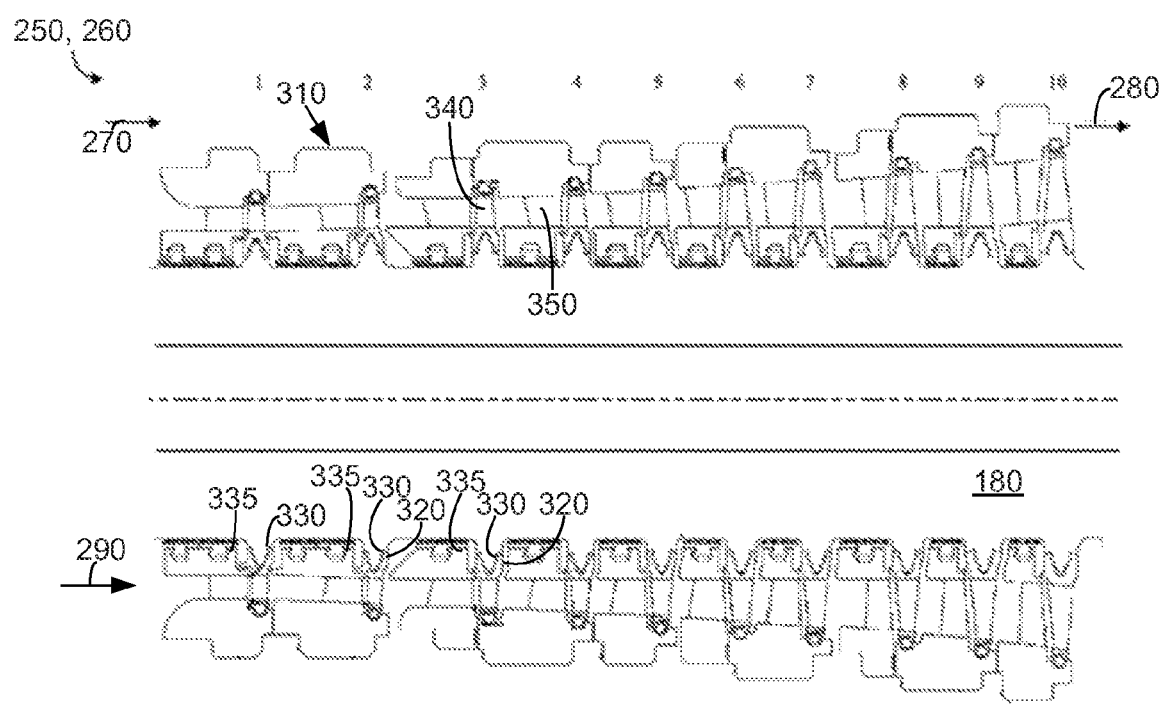
FIG. 2 is a partial side plan view of a high pressure or an intermediate section of a steam turbine.

FIG. 2 is a side cross-sectional view of a high pressure (HP) section 250 of the steam turbine 210. (An intermediate (IP) section 260 and/or a low pressure (LP) section have a substantially similar design such that the description will not be repeated.) The HP section 250 may include an entrance 270 and an exit 280. The entrance 270 may be in communication with the flow of steam 240 from the heat recovery steam generator 220 or other type of heat source such as a boiler, a steam generator, and the like. The exit 280 also may be in communication with the heat recovery steam generator 220 or other source so as to reheat the flow of steam 240 for use in a subsequent section of the steam turbine 210 or otherwise. A flow path 290 may extend through the IP section 250 from the entrance 270 to the exit 280.

The rotor 180 may extend along the flow path 290 within each section. A number of stages 310 also may be defined along the flow path 290. Each stage 310 may include a wheel 320 associated with the rotor 180. The wheels 320 may be spaced apart from each other along the rotor 180 with a stationary part 335. A wheel space 330 may be defined between each pair of the wheels 320. The wheels 320 may extend outward from the rotor 180. A bucket 340 may be attached to each of the wheels 320 for rotation therewith. Each stage 310 also includes a stationary nozzle 350 positioned adjacent to each bucket 340. Any number of stages 310 may be used herein. Other configurations and other components also may be used herein.

Figure 3:
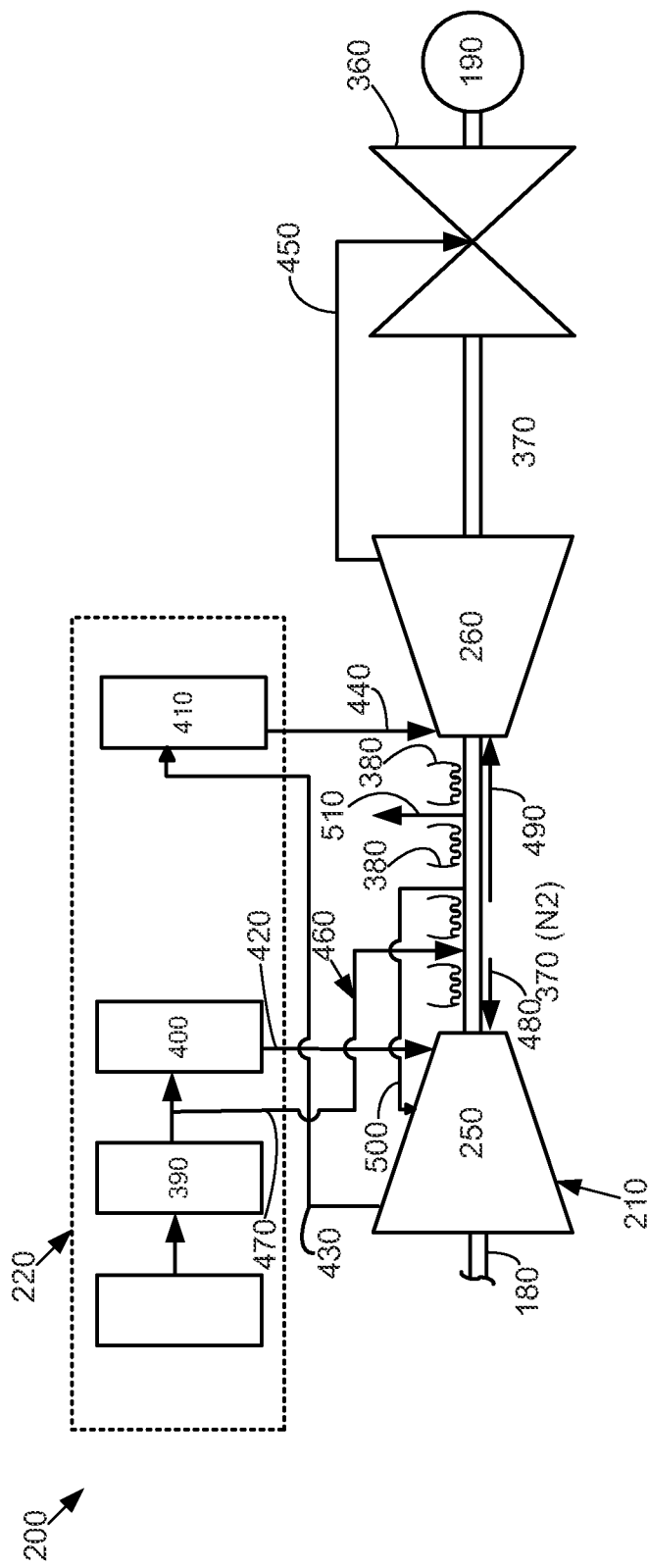
FIG. 3 is a schematic view of a steam turbine system as may be described herein having a steam turbine coupled to a heat recovery steam generator and a cooling system.

FIG. 3 shows an example of the steam turbine system 200 in detail. The steam turbine system 200 includes the steam turbine 210 with the HP section 250, the IP section 260, and a low pressure (LP) section 360. A number of shaft packing locations 370 may be positioned between the various sections 250, 260, 360 of the steam turbine 210. The shaft packing locations 370 also may be between the steam turbine 210 and the gas turbine 170, between the steam turbine 210 and the load 190, and elsewhere. In this example, the shaft packing location N2 may be positioned between the HP section 250 and the IP section 260. Each shaft packing location 370 may include a number of packing seals 380 positioned therein about the rotor 180 to prevent leakage thereacross. The packing seals 380 may include a number of different seal construction types. Although a shaft packing location 370 may be used between the IP section 260 and the LP section 360 (and shown in the figures below, the IP section 260 and the LP section 360 may be directly adjacent without a shaft packing location 370 therebetween. Other configurations may be used herein.

FIG. 3 also shows an example of the heat recovery steam generator 220. The heat recovery steam generator 220 recovers the waste heat from the flow of combustion gases 160 of the gas turbine engine 110, alone or in combination. The heat recovery steam generator 220 may be configured to transfer progressively lower grade heat from the flow of combustion gases 160 for each section of the steam turbine 210. The heat recovery steam generator 220 generally includes one or more superheaters, one or more evaporators, and one or more economizers in communication with each section 250, 260, 360 of the steam turbine 210. For clarity, only a first high pressure superheater 390, a second high pressure superheater 400, and a first intermediate pressure superheater 410 are shown herein.

A high pressure steam extraction 420 may be delivered from the second high pressure superheater 400 to the entrance 270 of the HP section 250 so as to drive the buckets 340 therein. A cold reheat extraction 430 may leave the exit 280 of the HP section 250 for reheating within the first immediate pressure superheater 410. An intermediate pressure steam extraction 440 then may be delivered to the entrance 270 of the IP section 260. An intermediate pressure crossover extraction 450 may be taken from the exit 280 of the IP section 260 and sent to the LP section 360. Steam from other sources may be combined with the intermediate pressure crossover extraction 450 at the exit 280 of the IP section 260. Other components and other configurations may be used herein.

The steam turbine system 200 also may include a wheel space cooling system 460. The wheel space cooling system 460 may include a cooling steam extraction 470. The cooling steam extraction 470 may be taken downstream of the first high pressure superheater 390 or an other suitable location from the heat recovery steam generator 220 and delivered to the shaft packing location 370 (N2) between the HP section 250 and the IP section 260. The cooling steam extraction 470 may be used to cool the first several stages 310 of the HP section 250 and the IP section 260, particularly about the wheel spaces 330 and the rotor 180 thereof. The cooling steam extraction 470 thus may be split into a high pressure cooling flow 480 heading towards the HP section 260 and an intermediate pressure cooling flow 490 heading towards the IP section 260. A portion of the intermediate pressure cooling flow 490 may be extracted in an intermediate pressure cooling flow extraction 500 and may be dumped into any of the stages 310 of the HP section 250 or elsewhere. Although the intermediate pressure cooling flow extraction 500 is shown positioned between about the sixth and seventh stages of the HP section 260, any stage may be used herein. A leakage flow 510 also may be used herein. The amount of the IP cooling flow extracted 500 may be based on an allowable temperature mismatch to enhance overall steam turbine performance. Other components and other configurations may be used herein.

Although the example described above concerned cooling the HP section 250 and the IP section 260, the LP section 360 also may be used herein. Moreover, the LP section 260 may act as the IP section 260 in the absence of an IP section 360. The term "IP section" 360 thus covers any type of section downstream from the HP section 250.

Figure 4:
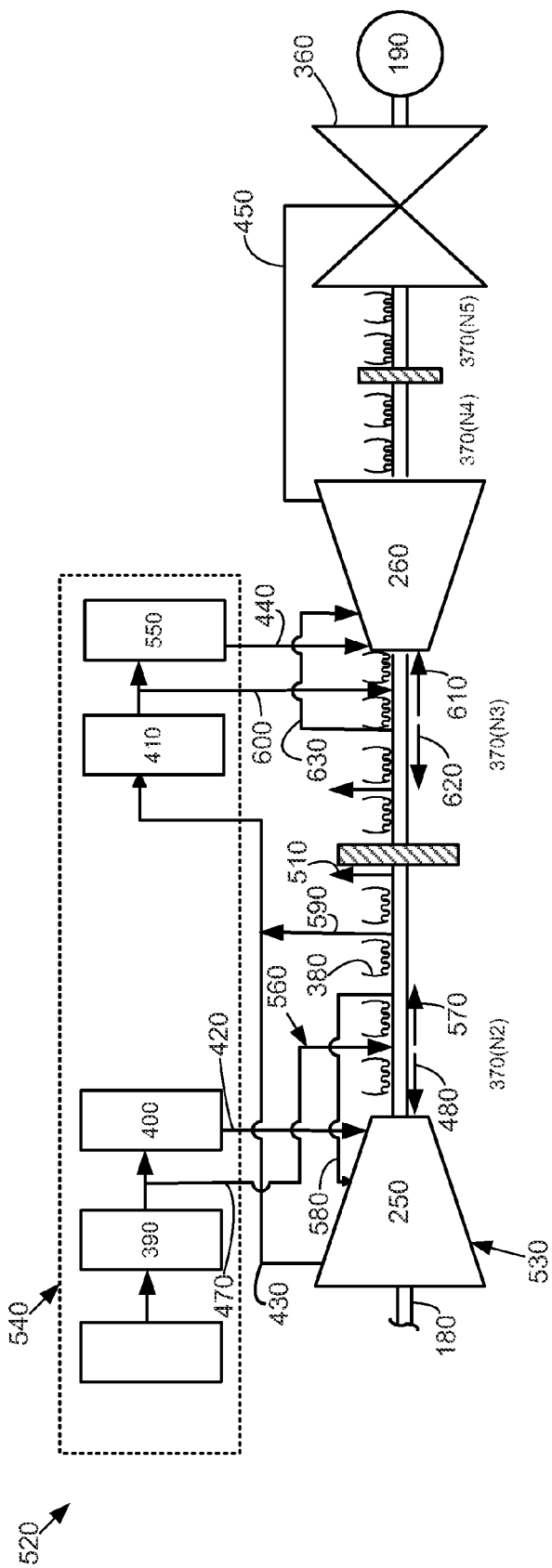
FIG. 4 is a schematic view of an alternative embodiment of a steam turbine system as may be described herein.

FIG. 4 shows a further example of a steam turbine system 520 as may be described herein. In this example, the steam turbine system 520 may use a steam turbine 530 similar to that described above but with additional shaft packing locations 370 positioned between the sections 250, 260, 360. In this example, shaft packing locations N2 and N3 are positioned between the HP section 250 and the IP section 260 with the shaft packing locations N4 and N5 positioned between the IP section 260 and the LP section 260. Likewise with respect to a heat recovery steam generator 540, a similar arrangement may be used as described above with a second intermediate pressure superheater 550 also shown. A boiler, a steam generator, or other source of steam also may be used herein.

The steam turbine system 520 also includes a wheel space cooling system 560. The wheel space cooling system 560 may include the high pressure cooling steam extraction 470 from upstream of the second high pressure superheater 400 or other suitable location in the heat recovery steam generator 220 and delivered to the shaft packing location N2. In this example, the high pressure cooling steam extraction 470 may split into the high pressure coating flow 480 headed towards the first stages 310 of the HP section 250 and a high pressure packing flow 570 that may cool the packing seals 370. A portion of the high pressure packing flow 570 may be extracted as a high pressure packing flow extraction 580 and dumped into any of the stages 310 of the HP section 250 or elsewhere. A portion of the high pressure packing flow 570 also may be extracted in a reheat flow 590 and/or sent to the first intermediate pressure superheater 410 or the intermediate pressure steam turbine 260 at a suitable stage 310. These flows may or may not mix before the first intermediate pressure superheater 410 if sent to the intermediate pressure superheater 410. Other components and other configurations may be used herein.

The wheel space cooling system 560 also may include an intermediate pressure cooling steam extraction 600. The intermediate pressure cooling steam extraction 600 may be taken upstream of the second intermediate pressure superheater 550 or other suitable location in the heat recovery steam generator 220 and delivered to the shaft packing location N3. The intermediate pressure cooling steam extraction 600 may split into an intermediate pressure cooling flow 610 that heads towards the early stages 310 of the IP section 260 for cooling about the wheel spaces 330 thereof. The intermediate cooling steam extraction 600 also may be split into an intermediate pressure packing flow 620 so as to cool the packing seals 380 therein of the IP section 260. An intermediate pressure packing flow extraction 630 may be taken from the intermediate pressure flow 620 and delivered to the later stages 310 of the IP section 260 for cooling/power generation therein. Other configuration and other components may be used herein. The intermediate pressure cooling crossover extraction 660 may also extend from the mixture of the cold reheat extraction 480 and an extraction from the high pressure packing flow 570.

Figure 5:
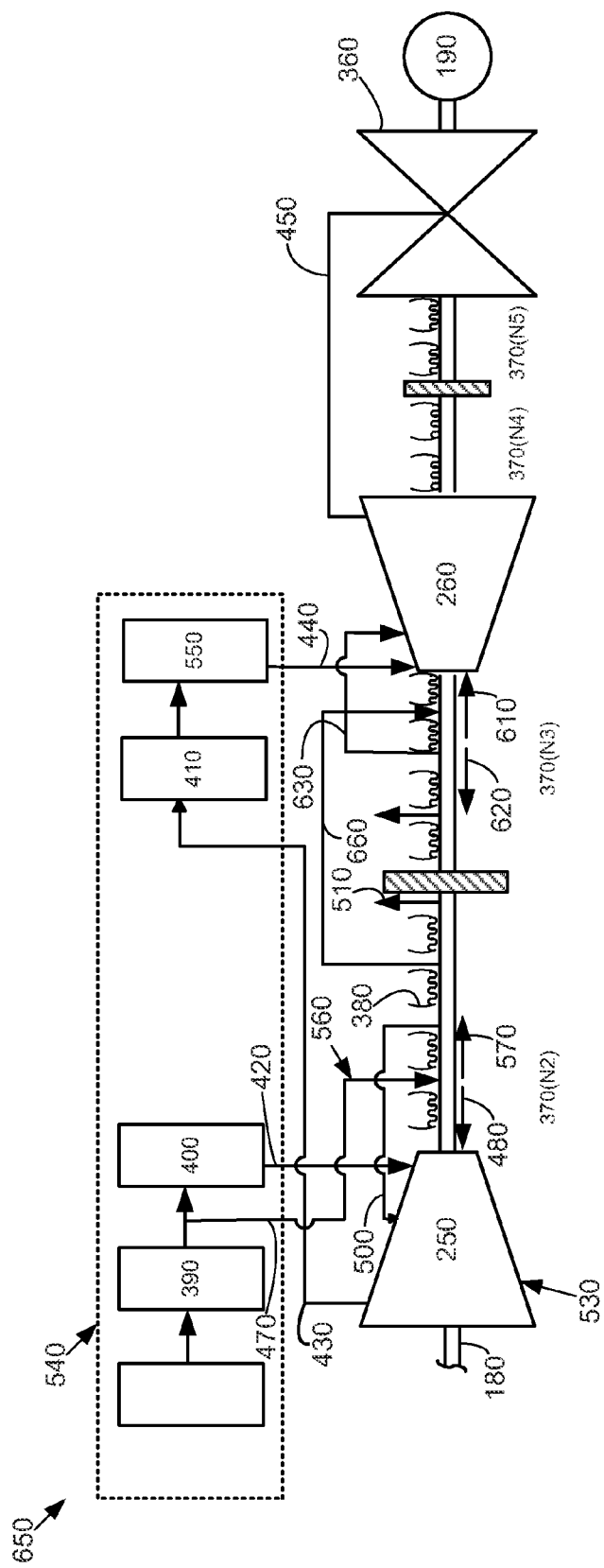
FIG. 5 is a schematic view of an alternative embodiment of a steam turbine system as may be described herein.

FIG. 5 shows a further embodiment of steam turbine system 650 as may be described herein. The steam turbine system 650 may be largely identical to the steam turbine system 520 described above, but without the use of the intermediate pressure cooling steam extraction 600. Instead, an intermediate pressure cooling crossover extraction 660 may be used. The intermediate pressure cooling crossover extraction 660 may extend from the high pressure packing flow 570 in the shaft packing location N2 and be delivered to the shaft packing location N3 in place of the intermediate pressure cooling steam extraction 600. Other configurations and other components also may be used herein.

The wheel cooling systems used herein thus use cooling steam from an external source so as to cool the wheel spaces 330 and the rotor 180 of the early stages 310 of the HP section and the IP section 260. Reducing the temperature herein may allow the use of a lower cost material for the rotor 180 and/or other components herein. Similarly, higher operating temperatures may be used with an associated higher power output and efficiency.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A steam turbine system, comprising:
a high pressure section;
an intermediate pressure section;
a shaft packing location positioned between the high pressure section and the intermediate pressure section;
a source of steam; and
a cooling system;
wherein the cooling system delivers a cooling steam extraction from the source of steam to the shaft packing location so as to cool the high pressure section and the intermediate pressure section, the cooling steam extraction comprising one or more packing flows with one or more packing flow extractions, wherein the one or more packing flow extractions comprise a crossover extraction.

2. The steam turbine system of claim 1, further comprising a rotor extending along the high pressure section, the shaft packing location, and the intermediate pressure section.

3. The steam turbine system of claim 2, wherein the shaft packing location comprises a plurality of packing seals positioned about the rotor.

4. The steam turbine system of claim 2, wherein the high pressure section and the intermediate pressure section comprise a plurality of stages therein and wherein each of the plurality of stages comprises a wheel and a bucket positioned about the rotor for rotation therewith.

5. The steam turbine system of claim 1, further comprising a heat recovery steam generator, steam generator, or boiler.

6. The steam turbine system of claim 5, wherein the source of steam comprises a superheater of the heat recovery steam generator.

7. The steam turbine system of claim 6, wherein the superheater of the heat recovery steam generator comprises a high pressure superheater.

8. The steam turbine system of claim 6, wherein the superheater of the heat recovery steam generator comprises an intermediate pressure superheater.

9. The steam turbine system of claim 8, further comprising a cold reheat extraction extending from the high pressure section to the intermediate pressure superheater.

10. The steam turbine system of claim 5, wherein the source of steam comprises a high pressure superheater and an intermediate pressure superheater.

11. The steam turbine system of claim 1, wherein the cooling steam extraction comprises a high pressure cooling flow heading towards the high pressure section and an intermediate pressure cooling flow heading towards the intermediate pressure section.

12. The steam turbine system of claim 11, wherein the intermediate pressure cooling flow comprises an intermediate pressure cooling flow extraction heading towards the high pressure section.

13. A method of cooling a number of wheel spaces of one or more sections of a steam turbine, comprising:

driving a section of the one or more sections of the steam turbine with a first source of steam with a first temperature;
extracting a second source of steam with a second temperature from a packing flow with a crossover extraction, wherein the second temperature is less than the first temperature;
delivering the extraction of the second source of steam to a shaft packing location adjacent to the one or more sections of the steam turbine;
flowing the extraction of the second source of steam into the one or more sections of the steam turbine; and
cooling the number of wheel spaces in the one or more sections of the steam turbine with the extraction of the second source of steam.

14. A combined cycle power plant, comprising:
a steam turbine;
the steam turbine comprising a plurality of sections with shaft packing locations therebetween;
a heat recovery steam generator;
a gas turbine engine; and
a cooling system;
wherein the cooling system delivers a cooling steam extraction from the heat recovery steam generator to one or more of the shaft packing locations so as to cool one or more of the plurality of sections, the cooling steam extraction comprising one or more packing flows with one or more packing flow extractions, wherein the one or more packing flow extractions comprise a crossover extraction.

15. The combined cycle power plant of claim 14, further comprising a rotor extending through the gas turbine engine and the steam turbine.

16. The combined cycle power plant of claim 14, wherein the heat recovery steam generator comprises one or more high pressure superheaters and one or more intermediate pressure superheaters.

17. The combined cycle power plant of claim 14, wherein the cooling steam extraction comprises a high pressure cooling flow heading towards a high pressure section and an intermediate pressure cooling flow heading towards an intermediate pressure section.

18. The combined cycle power plant of claim 14, wherein the intermediate pressure cooling flow comprises an intermediate pressure cooling flow extraction heading towards the high pressure section.

* * * * *